(12) United States Patent
Brody et al.

(10) Patent No.: US 8,173,222 B2
(45) Date of Patent: May 8, 2012

(54) CONTROLLED DEGRADABILITY OF ORGANIC MATERIALS

(75) Inventors: Spencer Brody, Whitehouse Sta, NJ (US); Brian Davis, Milltown, NJ (US)

(73) Assignee: Spencer Brody, Whitehouse Station, NJ (US)

( * ) Notice: Subject to any disclaimer, the term of this patent is extended or adjusted under 35 U.S.C. 154(b) by 663 days.

(21) Appl. No.: 12/381,605

(22) Filed: Mar. 13, 2009

(65) Prior Publication Data

US 2009/0232995 A1    Sep. 17, 2009

Related U.S. Application Data

(60) Provisional application No. 61/069,519, filed on Mar. 14, 2008.

(51) Int. Cl.
*B05D 1/36* (2006.01)
(52) U.S. Cl. ..... 427/402; 427/408; 427/411; 427/412.2; 427/419.8
(58) Field of Classification Search .................. 427/402, 427/408, 411, 412.2, 419.8
See application file for complete search history.

(56) References Cited

U.S. PATENT DOCUMENTS

2007/0065481 A1 * 3/2007 Chudzik et al. ............... 424/426

* cited by examiner

*Primary Examiner* — Eisa Elhilo
(74) *Attorney, Agent, or Firm* — Henry I. Schanzer (57) ABSTRACT

A chemical mixture for treating biodegradable materials which when subjected to anaerobic decomposition generate environmentally harmful gases such as methane and hydrogen sulfide. The chemical mixture includes chemicals for inhibiting the production of methane and hydrogen sulfide ($H_2S$). The mixture may be formed by: (a) combining compound(s) which inhibit the production of methane gas with compound(s) which inhibit the generation of hydrogen sulfide; and/or (b) using one or more compounds which can perform both functions. The biodegradable materials include all types of paper products. A liquid may be added to the chemical mixture to form a solution which may be applied, in any suitable manner, to biodegradable materials at any point during the manufacture of the materials and/or after the biodegradable materials are disposed of and ready for decomposition.

18 Claims, 9 Drawing Sheets

FIG. 1

STEP 1
FORMING SUBSTRATE

STEP 2
APPLICATION OF
ADHESIVE LAYER

STEP 3
ATTACHING TOP
SHEET TO SUBSTRATE

FIG. 2

1. Cardboard/Corrugated Mounted to Printed Stock (Paper) with Dextrin water based (Corn) Glue Carrier Containing Bio-Lith.

FIG 3A

2. Water based Bio-Lith Carrier Applied via Roller Cardboard/Corrugated/Paper and Dried Using High Frequency Dr

FIG 4

Fig. 5A Total volume of biogas from treated and untreated samples over four weeks.

Fig. 5B Total volume of carbon dioxide from treated and untreated samples over four weeks.

Fig. 5C Total volume of methane from treated and untreated samples over four weeks.

Fig. 6. Total sulfides (soluble and insoluble) from treated and untreated samples.

CONTROLLED DEGRADABILITY OF ORGANIC MATERIALS

BACKGROUND OF THE INVENTION

This invention claims priority from provisional application Ser. No. 61/069,519 for ENHANCED DEGRADABILITY OF PAPER PRODUCTS filed Mar. 14, 2008 whose teachings are incorporated herein.

This invention relates to method and apparatus for modifying the disintegration and degradability of biodegradable products, such as organic materials including paper and paperboard products, and to chemical compositions for reducing the production of environmentally undesirable gases, such as methane and hydrogen sulfide, generated during the disintegration, decomposition and degradation of the biodegradable products.

By way of example, a problem exists when biodegradable products such as paper and paperboard products are discarded and buried in a landfill and/or garbage dump. As these paper products disintegrate under anaerobic conditions methane gas is produced and introduced into the atmosphere. This is highly undesirable as methane is a potent greenhouse gas and has a high global warming potential. The U.S. EPA estimates that methane has 21 times the global warming potential of carbon dioxide. The EPA has also determined that landfills are a major source of atmospheric methane.

It is therefore an object of the invention to modify the degradability of biodegradable products to reduce the generation of selected environmentally undesirable and potentially harmful gases.

SUMMARY OF THE INVENTION

As used herein and in the accompanying claims, the term "chemical mixture" or "chemical composition" is intended to include: a) a dry mixture of the chemicals which may be dissolved in water or other suitable liquid to form a slurry or solution; and b) an aqueous solution of the chemicals.

In accordance with the invention, biodegradable products are treated with a chemical mixture for controlling biogases emitted by the biodegradable matter as it undergoes anaerobic decomposition. The chemical mixture includes chemicals which inhibit the production of methane gas.

Applicants also recognized that certain chemical solutions (e.g., sulfates) designed to inhibit the production of methane gas may result in the production of toxic, corrosive and foul-smelling hydrogen sulfide ($H_2S$). It is therefore another aspect of the invention to also treat biodegradable materials with chemicals which inhibit the production of hydrogen sulfide gas.

The chemical solution may be formed by: (a) combining compound(s) which inhibit the production of methane gas with compound(s) which inhibit the generation of hydrogen sulfide; and/or (b) using one or more compounds which can perform both functions; and (c) combining the compounds, which are soluble, with a liquid to form a slurry or solution.

Compounds which may be used to inhibit methanogenesis include, for example, those providing a source of ferric ions ($Fe^{+3}$) and/or those providing a source of sulfate ions, $SO_4^{-2}$. Compounds which may be used to inhibit the production of hydrogen sulfide include, for example, those providing a source of metal divalent cations. Also, depending on the selected compounds and their interaction, it may be desirable to add small amounts of acid to ensure that the pH of the resultant chemical solution is below 7.

In accordance with one aspect of the invention, the chemical solution includes a combination of one or more of the following compounds: (a) Ferric ammonium citrate (compounds of citrate, $Fe^{+3}$ and $NH_3$), which is more soluble than most ferric-ion compounds, to inhibit the production of methane (i.e., methanogenesis) by supplying ferric ions ($Fe^{+3}$), favoring the growth of iron-reducing microbes which can then out-compete the methane-producing microbes; (b) Ferrous sulfate ($FeSO_4.H_2O$) which inhibits methanogenesis by supplying sulfate ions ($SO_4^{-2}$), favoring the growth of sulfur-reducing microbes which can then out-compete the methane-producing microbes, and which restricts the build-up of hydrogen sulfide ($H_2S$) by the binding of ferrous ions ($Fe^{+2}$) to sulfide, forming an insoluble compound;

(c) Magnesium sulfate ($MgSO_4.7H_2O$) which inhibits methanogenesis by supplying sulfate ions ($SO_4^{-2}$), favoring the growth of sulfur-reducing microbes which can then out-compete the methane-producing microbes, and which is very soluble and forms a clear, uncolored solution;

(d) Copper sulfate ($CuSO_4.5H_2O$) which inhibits methanogenesis by supplying sulfate ions ($SO_4^{-2}$), favoring the growth of sulfur-reducing microbes which can then out-compete the methane-producing microbes, and which restricts the build-up of hydrogen sulfide ($H_2S$) by the binding of copper ions ($Cu^{+2}$) to sulfide, forming an insoluble compound; (e) Manganese gluconate (gluconic acid, Mn salt) which restricts the build-up of hydrogen sulfide ($H_2S$) by the binding of manganese ion ($Mn^{+2}$) to sulfide, forming an insoluble compound; and (f) Zinc gluconate (gluconic acid, Zn salt) which restricts the build-up of hydrogen sulfide ($H_2S$) by the binding of zinc ions ($Zn^{+2}$) to sulfide, forming an insoluble compound.

Thus, an aspect of the invention is to treat biodegradable products with chemicals which inhibit or reduce: (a) the generation of methane gas; and (b) the generation of potentially toxic and malodorous gases [(e.g., hydrogen sulfide ($H_2S$)], when the biodegradable products (e.g., paper products) are in a landfill or garbage dump, or in any location which causes the biodegradable material to undergo decomposition under anaerobic conditions.

Another aspect of the invention is to manufacture biodegradable products (e.g., paper, paperboard, paper packaging, disposable marketing displays and materials) treated with chemical solutions of the type described above such that, when these products are disposed in a landfill or like waste disposal means, the biodegradable products will break down mostly toward the formation of carbon dioxide ($CO_2$) and away from the formation of methane ($CH_4$) and, at the same time, without generating toxic and malodorous gases [(e.g., hydrogen sulfide ($H_2S$)].

One aspect of Applicants' invention includes mixing the methane-inhibiting chemical solutions and hydrogen-sulfide-inhibiting chemical solutions with a biodegradable adhesive, such as a dextrin glue compound (e.g., corn starch glue), and applying the mixed chemical solution to paper and paperboard products. The applied mixed chemical solution reduces the amount of methane produced and also reduces the generation of the toxic and malodorous gas hydrogen sulfide ($H_2S$).

Another aspect of Applicants' invention includes Impregnating paper and paperboard products with a chemical solution which reduces the amount of methane produced without generating the toxic and malodorous gas hydrogen sulfide ($H_2S$). Thus, decomposition of the biodegradable matter is accomplished in a manner which is significantly more environmentally friendly.

Still further, another aspect of Applicants' invention includes using a paper material manufactured to have a lower pH than usual, and still consistent with a desired paper quality, and treating or combining (mixing or impregnating) the paper material with compounds inhibitory to methanogenesis. Examples of such compounds include solutions of sulfate and ferric ammonium citrate or ferric pyrophosphate. In addition, it is desirable that the sulfate solutions be supplied in the form of ferrous sulfate, or sulfate bonded with a different divalent metal cation, as divalent metal cations tend to prevent the build-up of $H_2S$.

BRIEF DESCRIPTION OF THE DRAWING

In the accompanying drawings, which are not drawn to scale, like reference characters denote like components.

DETAILED DESCRIPTION OF THE INVENTION

As noted above, a problem exists when biodegradable matter deposited in landfills (garbage dumps) undergoes anaerobic degradation because methane gas is produced and methane gas has a very high (harmful) global warming potential. One aspect of Applicants' invention is to decrease the production of methane at the expense of possibly increasing, the production of carbon dioxide. Carbon dioxide is also not desirable, but methane gas is so much more potent that it is preferable to have carbon dioxide rather than methane.

Biodegradable matter, as used herein and in the accompanying claims, refers generally to organic material such as plant and animal matter and other substances originating from living organisms, or artificial materials that are similar enough to plant and animal matter to be put to use by microorganisms.

Biodegradable waste forms a major fraction of municipal solid waste, typically originating from plant or animal sources, which may be broken down by other living organisms. Waste that cannot be broken down by other living organisms may be called non-biodegradable. Biodegradable waste in landfill degrades in the absence of oxygen through the process of anaerobic digestion. The byproducts of this anaerobic biodegradation are biogas and lignin and a few components which cannot be broken down by anaerobes (anaerobic microbes). Biodegradable waste includes, for example, food waste, paper waste, biodegradable plastics, human waste, manure, sewage, and slaughterhouse waste. Biodegradable waste contributes to global warming. When it is disposed of in landfills (or like sites), it breaks down under uncontrolled anaerobic conditions and produces gases such as methane, which is a more potent (harmful) greenhouse gas than carbon dioxide.

Paper products and other like materials are included in biodegradable waste and, when undergoing biodegradation, produce-biogas which contains methane which, as noted above, has approximately 21 times the global warming potential of carbon dioxide.

In accordance with the invention, chemical solutions were developed which may be used to treat paper products and/or any biodegradable matter to inhibit the production of methane gas and hydrogen sulfide gas when the paper products and the biodegradable matter undergo decomposition. With regard to the paper products, the chemical solution can be applied at suitable times during the manufacture of the paper products, before the paper reaches the consumer, and is expected to be effective when the paper product is disposed of or discarded (e.g., reaches a landfill). The chemical solution may also be used to treat biodegradable matter located in any conceivable site or location (e.g., landfill, garbage truck). For example, a landfill may be treated by spraying the landfill with the chemical solution in liquid form. A landfill may also be treated or by any other suitable method of applying the chemicals as a mixture in dry form or in solution.

As already noted, chemical solutions embodying the invention may be formed using a combination of one or more compounds which inhibit the formation of methane gas, and one or more compounds which inhibit the formation of hydrogen sulfide. Compounds which may be used to inhibit methanogenesis include, for example, those providing a source of ferric ions ($Fe^{+3}$) and/or those providing a source of sulfate ions, $SO_4^{-2}$. Compounds which may be used to inhibit the production of hydrogen sulfide include, for example, those providing a source of, metal divalent cations. Also, depending on the selected compounds and their interaction, it may be desirable to add small amounts of acid to ensure that the pH of the resultant chemical solution is below 7. In addition, some compounds may inhibit the production of both methane and hydrogen sulfide gases.

Classes of compounds suitable to practice the invention are set forth in the table below:

| Compound Category | Function | Preferred Compounds | Related Compounds |
|---|---|---|---|
| sulfate + metal ions | sulfate component: inhibit methanogenesis metal component: prevent $H_2S$ build-up | copper sulfate, ferrous sulfate, magnesium sulfate | other metal sulfates such as barium, cobalt, manganese, zinc and others |
| ferric ions | inhibit methanogenesis | ferric ammonium citrate | ferric citrate, ferric pyrophosphate, other ferric-ion-containing compounds |
| divalent metal ions, non-sulfates | prevent $H_2S$ build-up | manganese gluconate, zinc gluconate | other divalent metal ion-containing compounds, including various salts of barium, cobalt, copper, manganese, zinc and others |

Note that the sulfate compounds with metal ions function to inhibit the production of both methane and hydrogen sulfide, while the compounds providing ferric ions function primarily to inhibit only methane.

A particular group of compounds from the classes set forth in the table, above, were selected due to the general consideration discussed above and because of their efficacy as discussed below.

(a) Ferric ammonium citrate (compounds of citrate, $Fe^{+3}$ and $NH_3$) which inhibits methanogenesis by supplying ferric ions ($Fe^{+3}$), favoring the growth of iron-reducing microbes which can then out-compete the methane-producing microbes. This compound is approved for use in food (Federal regulation 21-184.1296). It is also more soluble than most ferric-ion compounds.

(b) Ferrous sulfate ($FeSO_4.7H_2O$) which inhibits methanogenesis by supplying sulfate ions ($SO_4^{-2}$), favoring the growth of sulfur-reducing microbes which can then out-compete the methane-producing microbes. This compound restricts the build-up of hydrogen sulfide ($H_2S$) by the binding of ferrous ions ($Fe^{+2}$) to sulfide which forms an insoluble compound. It is also approved for use in food (Federal regulation 21-184.1315).

(c) Magnesium sulfate ($MgSO_4.7H_2O$) which inhibits methanogenesis by supplying sulfate ions ($SO_4^{-2}$), favoring the growth of sulfur-reducing microbes which can then out-compete the methane-producing microbes. This compound is also approved for use in food (Federal regulation 21-184.1443). It is also very soluble and forms a clear, uncolored, solution. The clear uncolored solution is highly desirable. For, when this compound is applied to certain paper products or packaging materials, it does not affect (change) the color of the paper which might render it unattractive to a user.

(d) Copper sulfate ($CuSO_4.5H_2O$) which inhibits methanogenesis as it supplies sulfate ions ($SO_4^{-2}$), favoring the growth of sulfur-reducing microbes which can then out-compete the methane-producing microbes. This compound also inhibits the build-up of hydrogen sulfide ($H_2S$) as it allows the binding of copper ions ($Cu^{+2}$) to sulfide, forming an insoluble compound which reduces the formation of ($H_2S$) and the emission of gases to the atmosphere. This compound is also approved for use in food (Federal regulation 21-184.1261).

(e) Manganese gluconate (gluconic acid, Mn salt) which restricts the build-up of hydrogen sulfide ($H_2S$) by the binding of manganese ions ($Mn^{+2}$) to sulfide, forming an insoluble compound which limits the amount of gas emission to the atmosphere. This compound is also approved for use in food (Federal regulation 21-184.1452).

(f) Zinc gluconate (gluconic acid, Zn salt) which restricts the build-up of hydrogen sulfide ($H_2S$) by the binding of zinc ions ($Zn^{+2}$) to sulfide, forming an insoluble compound. It is also approved for use in food (Federal regulation 21-182.8988)

Compounds (a) through (f) may be used to treat paper products which are used to package food products since they are all approved for food use. Note that because of this feature, these compounds may be fed to ruminant animals to treat the processing of biodegradable matter within their digestive tracts.

Compounds (a) through (f) are also sufficiently soluble to enable the manufacture of solutions (slurries) which can be applied or sprayed in many different modes. Thus, solutions of the above identified compounds may be used to treat biodegradable matter, wherever located, by spraying the biodegradable matter or by applying the solution in any suitable manner.

By way of example, two solutions (I and II) selected from compounds (a) through (f) were formed and applied to waste products and paper board products to test the efficacy of the solutions.

I—Solution I (also referred to as Mixture A or the "Fe" solution or Biolithe A) was formulated in distilled water as follows in grams/liter:

Solution I ("Fe")

| | |
|---|---|
| (a) ferric ammonium citrate | 47.9 g/L |
| (b) ferrous sulfate | 50.0 g/L |
| (d) copper sulfate | 2.5 g/L |
| (e) manganese gluconate | 4.8 g/L |
| (f) zinc gluconate | 12.7 g/L |

II—Solution II (also referred to as "Mixture B or the "Mg" solution or Biolithe B) was formulated in distilled water as follows:

| | |
|---|---|
| (a) ferric ammonium citrate | 47.9 g/L |
| (c) magnesium sulfate | 44.4 g/L |
| (d) copper sulfate | 5.0 g/L |
| (e) manganese gluconate | 9.6 g/L |
| (f) zinc gluconate | 30.6 g/L |

Note that the above cited amount and ratios of the various compounds used to form the solutions are for purpose of illustration only. It should be understood that the amount and ratios selected can vary over a very wide range.

Figure 4:
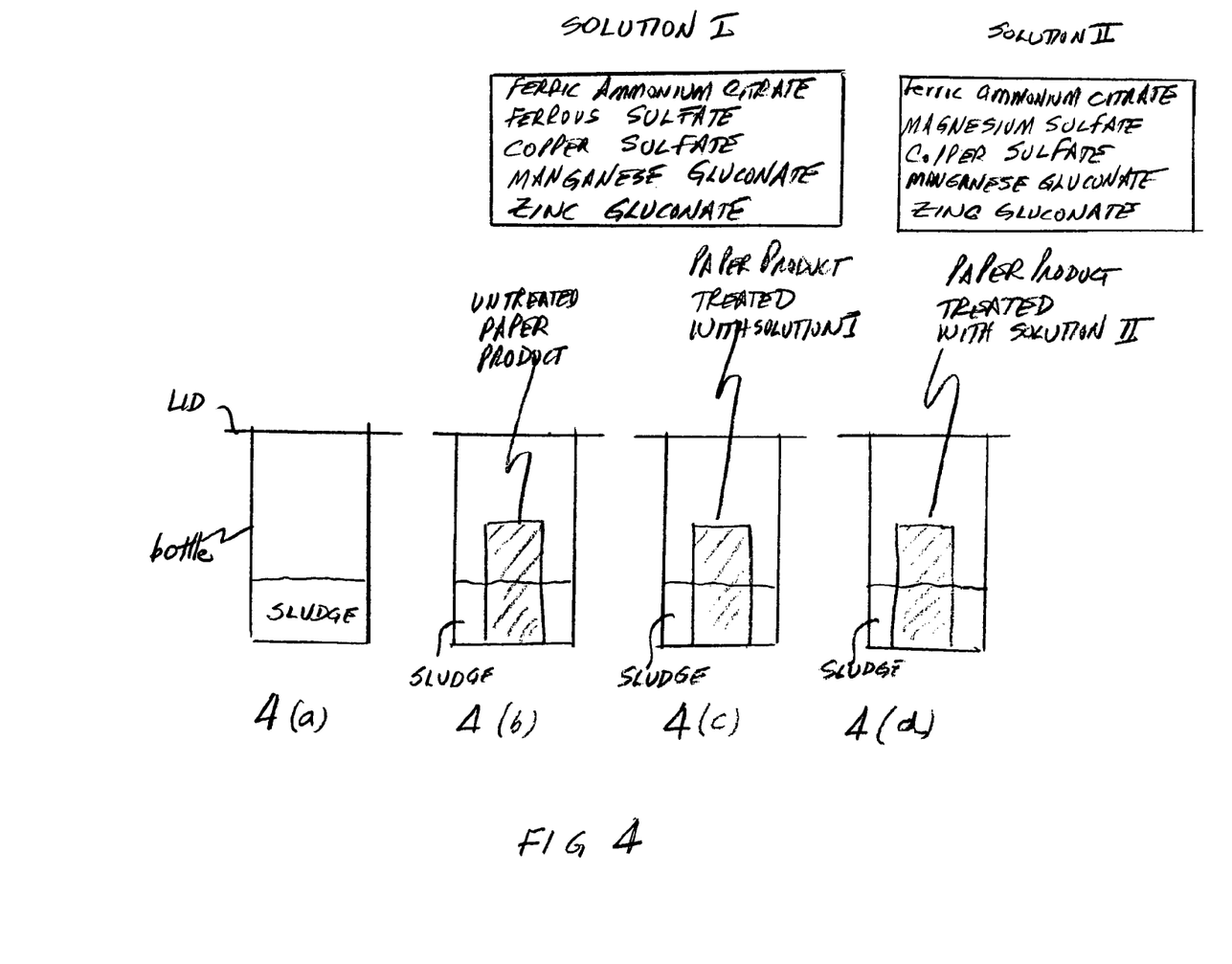
FIGS. 4(a), 4(b), 4(c) and 4(d) illustrate, in a highly simplified manner, the testing of a paper product treated in accordance with the invention and an untreated paper product.

The effect of solutions I and II on a paper product was measured as shown (in a highly simplified manner) in FIGS. 4(a), 4(b), 4(c) and 4(d). A paper product was treated with solutions I and II and the gases emitted during the decomposition were measured and compared to the amount of gases emitted by an untreated paper product. The paper product used in the testing was 26 mil chipboard which is 100% recycled from post consumer cardboard, paper and news print. The paper product was placed in a bottle containing a sludge (inoculum) selected to be an anaerobic digester effluent, pond sediment and washings from landfill solids. An untreated paper product was placed in one bottle (see FIG. 4b). A paper product treated with solution "I" was placed in another bottle as shown in FIG. 4c and a like paper product treated with solution "II" was placed in another bottle as shown in FIG. 4d.

Figure 5A:
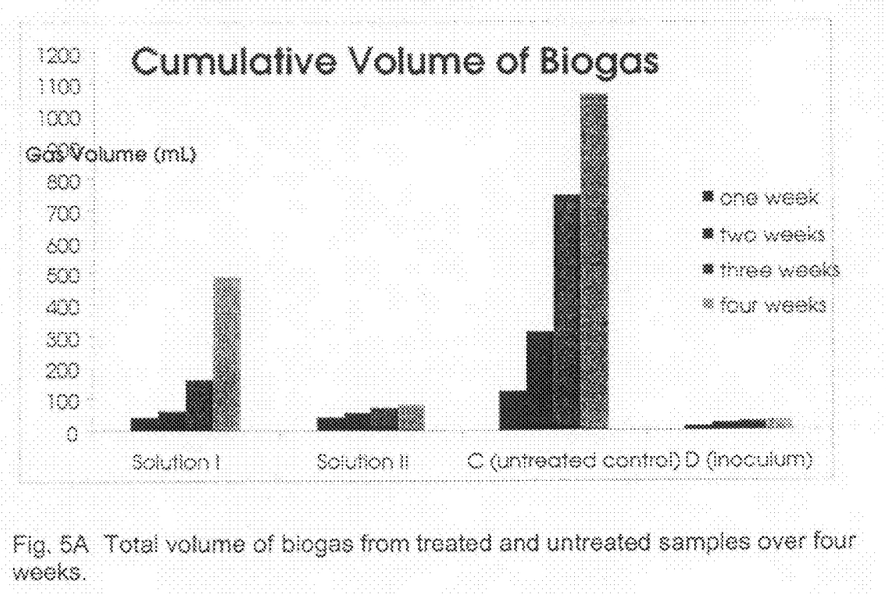
FIGS. 5A, 5B, and 5C and FIG. 6 are bar charts showing test results obtained with paper products treated in accordance with the invention and untreated paper.
Figure 5B:
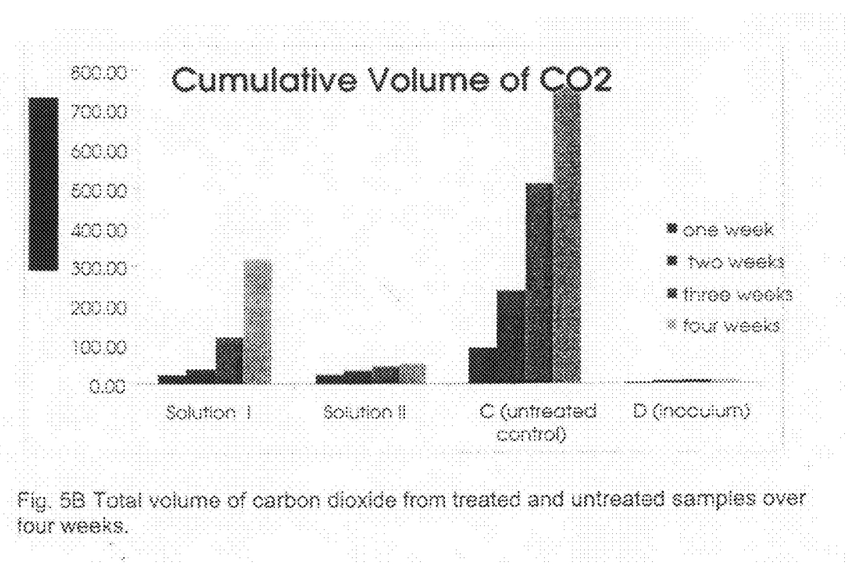
Figure 5C:
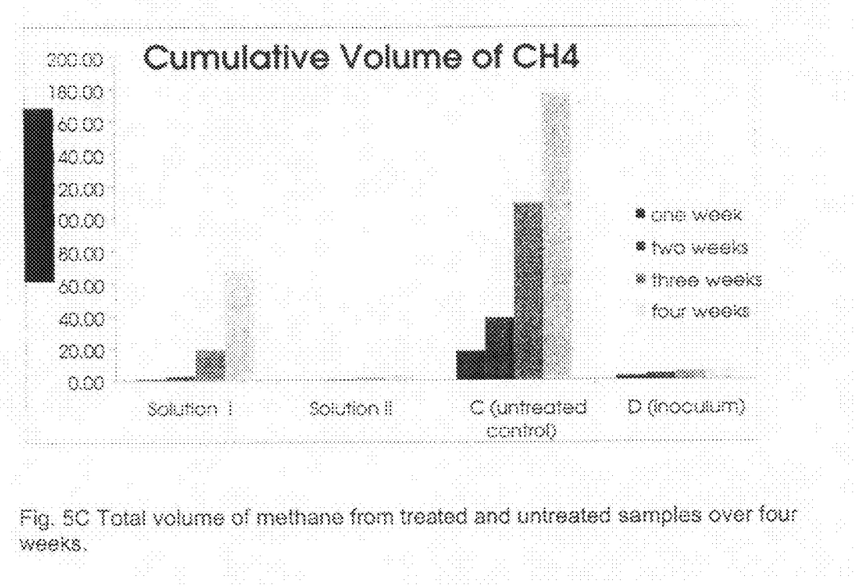

Results of the testing are shown in FIGS. 5A, 5B, and 5C and are summarized in the table below.

| | Total Gas Volumes (Cumulative - 4 weeks) | | | |
|---|---|---|---|---|
| Gas | Inoculum (sludge), ml of gas | Untreated Paper, ml of gas | Treatment Solution I, ml of gas | Treatment Solution II, ml of gas |
| $CO_2$ | 10.6 | 760.3 | 318.5 | 50.5 |
| $CH_4$ | 6.2 | 177.8 | 68.1 | 2.7 |

An examination of FIGS. 5A, 5B and 5C shows that after 4 weeks of testing the untreated paper product generated approximately 760 milliliters of $CO_2$ and 177 milliliters of $CH_4$. In sharp contrast, the paper product treated with solution I generated approximately 318 milliliters of $CO_2$ and 68 milliliters of $CH_4$ and the paper product treated with solution 11 generated approximately 50 milliliters of $CO_2$ and 2.7 milliliters of $CH_4$.

As shown in FIG. 5A, the total volume of biogas generated by the paper treated with solutions I and II is significantly less than that for the untreated paper. It should also be noted that the cumulative volume of biogas produced for the paper product treated with solution II is significantly less than that for the paper treated with solution I. Of particular significance, is the very small amount of methane gas produced for the treated paper product when compared to the untreated paper product, as shown in FIG. 5C. Here again, solution II is also more effective than solution I in limiting the amount of methane gas generated. It is also to be noted that the test results indicate that the volume of carbon dioxide generated by the treated paper is less than that generated by the untreated paper, as shown in FIG. 5B. These results indicate that treating paper products with solutions embodying the invention significantly reduce the rate at which biogases of all types are generated.

Figure 6:
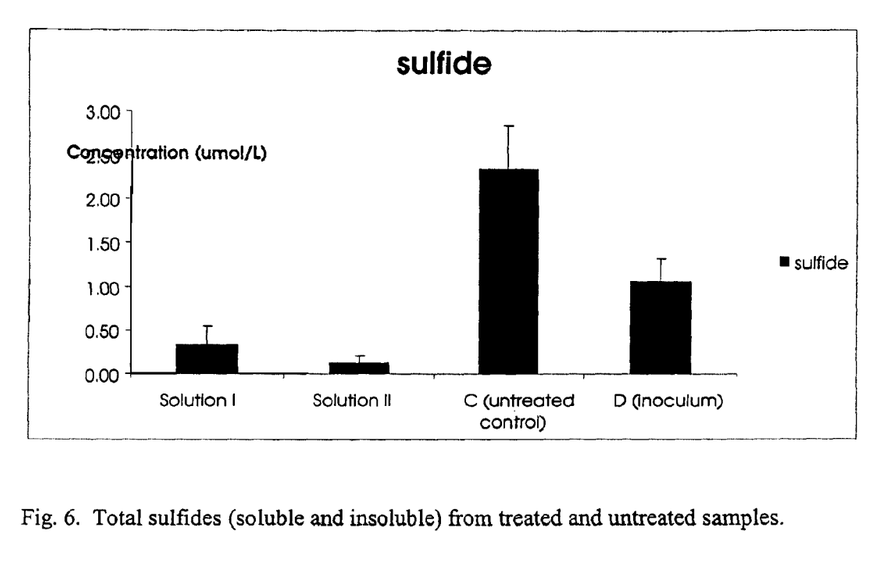

An examination of FIG. 6, which represents results of sulfide gases generated, indicates that the amount of sulfides and hence, of hydrogen sulfide, is significantly lower for the paper products treated with solutions I and II as compared with the untreated paper product.

It is evident from the test results that the total amount of biogas generated from the treated paper product is at a significantly lower level than the amount of biogas generated from the untreated paper product. It is further evident that the amount of methane gas generated from the treated paper product is very much below the level generated from the untreated paper product. This is particularly so for the paper product treated with solution II. Still further, even the amount of carbon dioxide generated from the treated paper product is at a significantly lower level than the amount of generated from the untreated paper product. Again, this is particularly so for the paper product treated with solution II.

Applicants' invention is now illustrated with reference to paper and paper products. But, as already noted, solutions embodying the invention are applicable for use in the treatment of any biodegradable matter, wherever located. Note that the term "paper product" as used herein, and in the appended claims, is intended to include and refer to any and all types of paper products, boxes, posters, point of purchase (POP) displays, folders, packaging supplies, etc.

Figure 1:
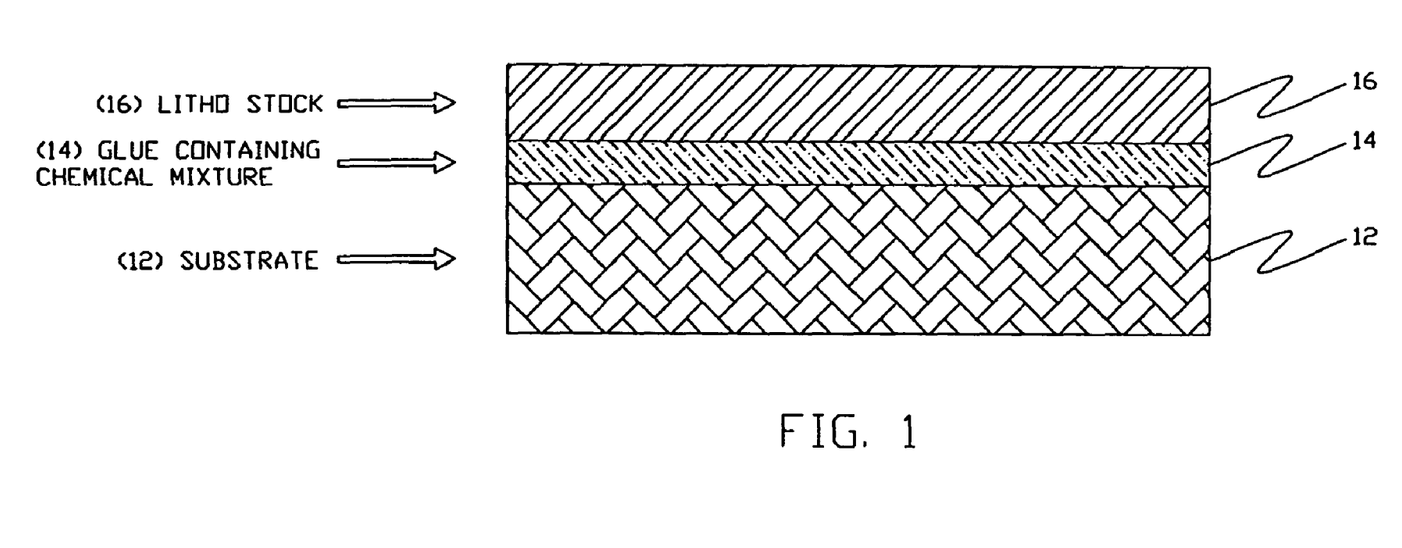
FIG. 1 is a cross sectional diagram of a paper product formed in accordance with the invention.

FIG. 1 shows that a paper product 20 embodying the invention typically includes a substrate 12 attached to an overlying paper sheet 16 by means of an intermediate adhesive layer 14. The substrate 12 may be corrugated, chip board or paper stock, or any other suitable substrate. The adhesive layer 14 may be a layer of a (corn) water based adhesive carrier, e.g., dextrin, of, for example, 1 millimeter thickness. Any suitable adhesive may be used. However, the proposed dextrin adhesive has certain characteristics which make it attractive for use: (a) It is very stable; (b) it has high adhesion to cellulose and many porous substrates; (c) it is Insoluble in oils and fats; (d) it is non-toxic and biodegradable; and (e) it is heat resistant.

The overlying sheet 16 may be paper stock which is usually between 3 to 10 mil thick. Typically the grain direction of the paper stock should be 90 degrees to that of the substrate.

Figure 2:
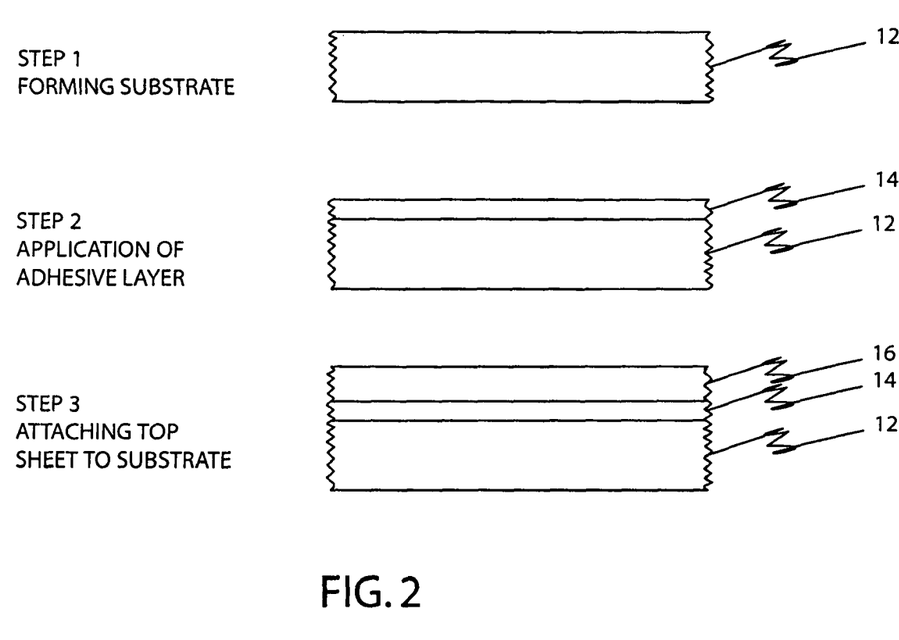
FIG. 2 is a diagram of various steps used to form a paper product embodying the invention.

FIG. 2 illustrates a method for applying the layer 14 to the substrate 12 and attaching layer 16 to layer 14. In accordance with the first step, a substrate 12 having desired characteristics is selected. Then, in step 2, a coating layer is formed on the substrate which coating layer is subsequently used (in step 3) as the adhesive layer 14. In step 3, the top layer 16 is attached (bonded) to the substrate 12 to form a relatively rigid paper product which can be used to form boxes, posters, point of purchase (POP) displays, folders, packaging supplies, etc.

In accordance with the invention, the adhesive layer may be formulated to include a chemical solution embodying the invention which will enhance the degradability of the paper product. The formulated or treated adhesive is then used to bond the substrate 12 to another layer 16 while at the same time carrying chemicals used to enhance degradability of the paper product 20.

Figure 3A:
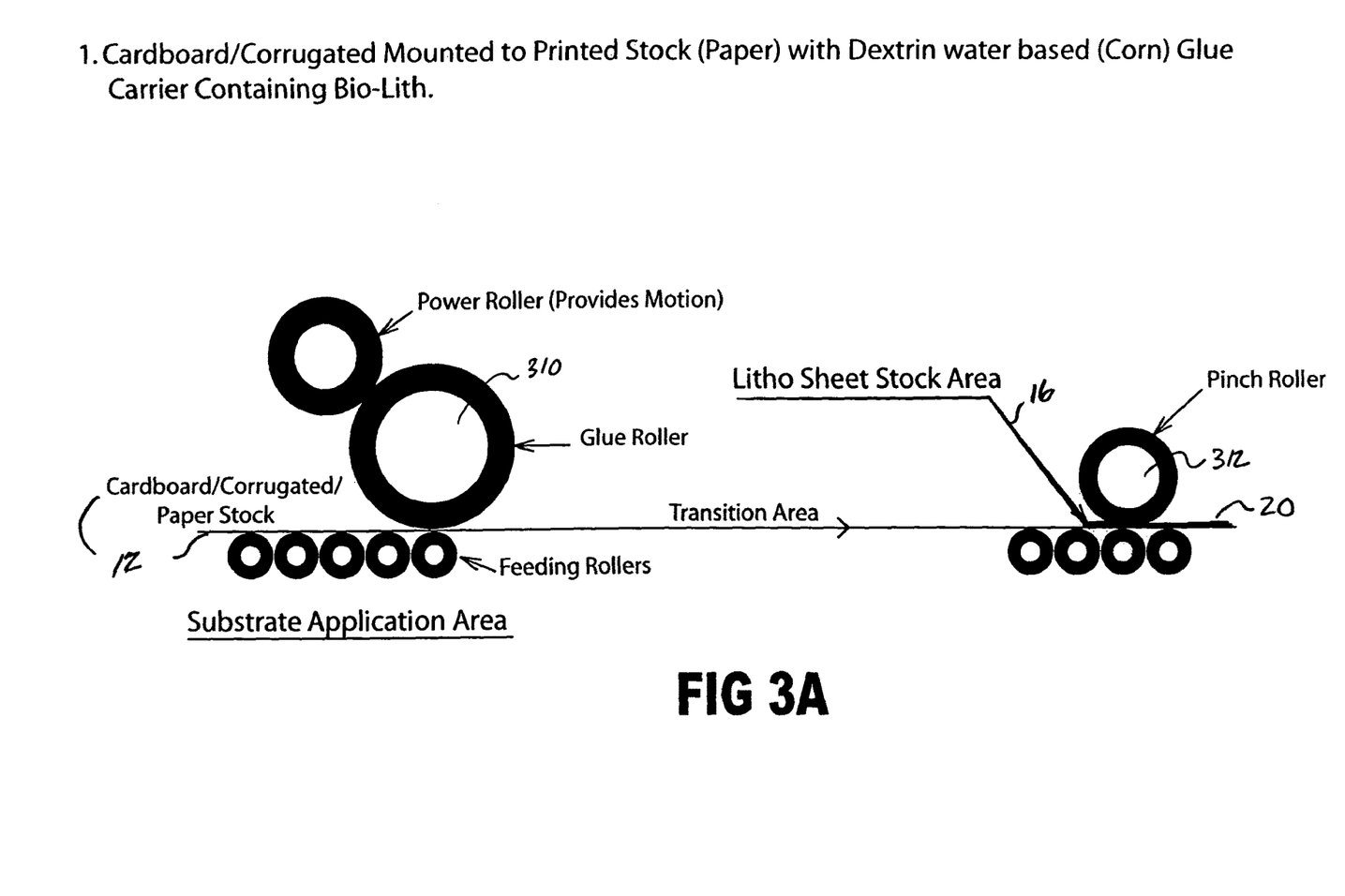
FIG. 3A illustrates apparatus for applying a specially formulated adhesive (glue) to a substrate via a glue roller.

FIG. 3A illustrates apparatus for applying a specially formulated adhesive (glue) to a cardboard/corrugated paper stock substrate 12 via a glue roller 310 and the bonding of a litho sheet 16 to the substrate using the treated glue as the bonding agent. That is, mixed in or within the glue is a chemical mixture/solution embodying the invention. As shown in FIG. 3A, the substrate 12 may be cardboard or corrugated stock, the adhesive may be a water based corn starch glue treated with a selected formulation embodying the invention to enhance biodegradability. Pinch roller 312 is used to control the feed of the layer 16 onto the substrate 12 to produce the desired paper product 20.

Figure 3B:
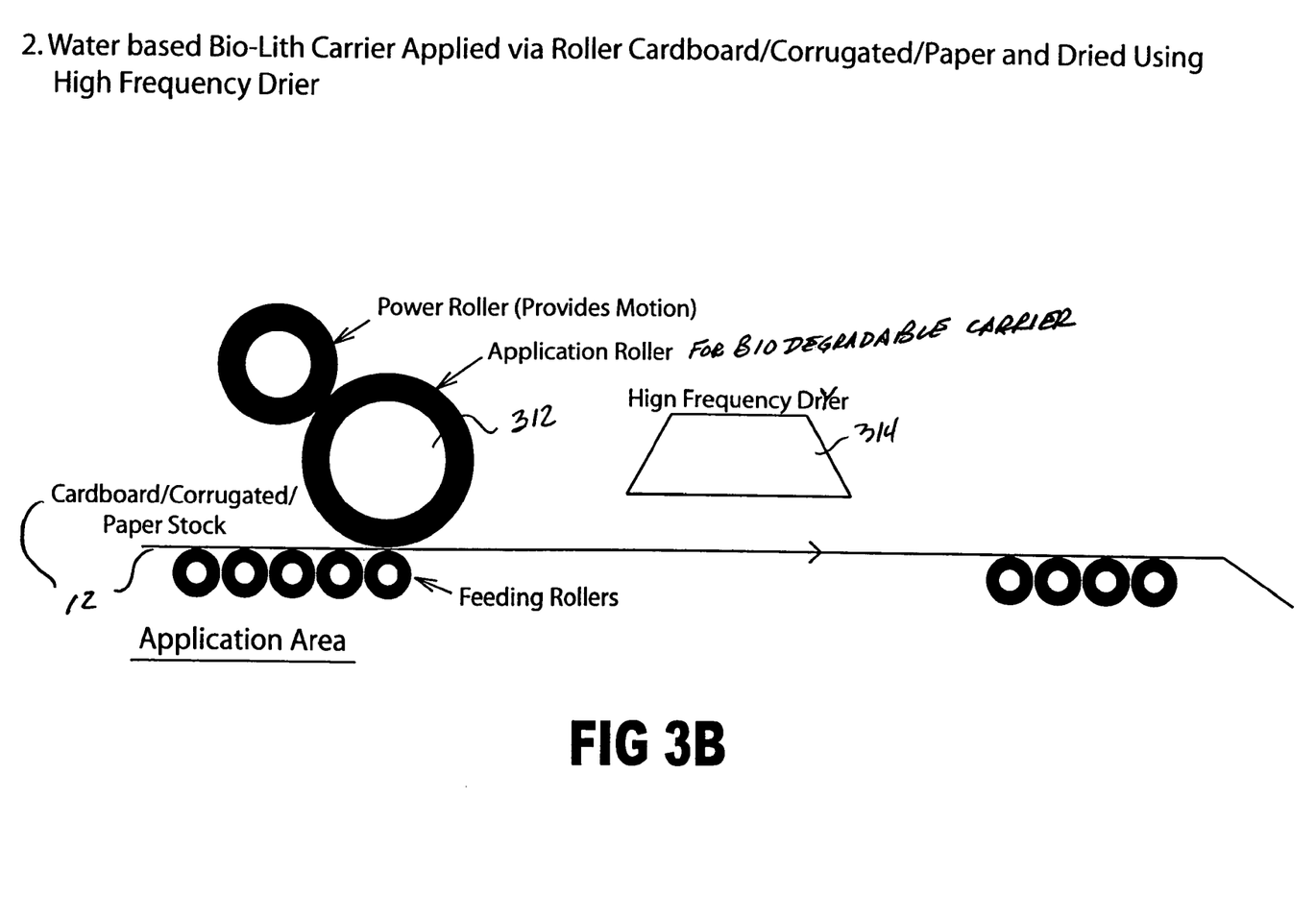
FIG. 3B illustrates the impregnation of a water or alcohol based chemical formulation into a substrate layer.

FIG. 3B illustrates the impregnation of a water, or alcohol, based chemical formulation into a substrate layer 12 and drying the treated substrate for subsequent use (e.g., subsequent bonding to litho layer). An application roller 312 may be used to apply the chemical formulation embodying the invention directly into the substrate and a high frequency dryer 314 may be sued to dry the treated substrate.

Figure 3C:
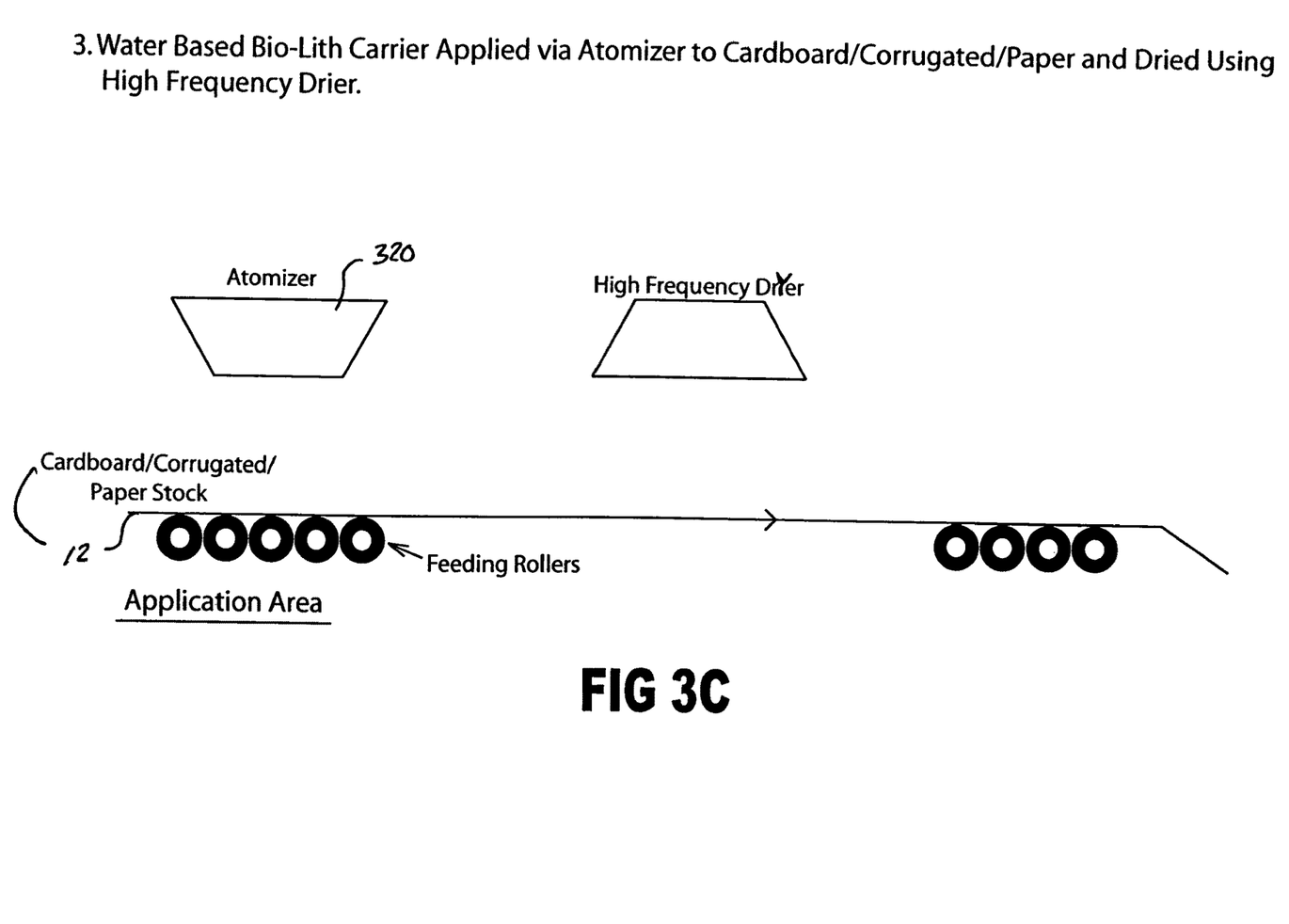
FIG. 3C illustrates the application of a water or alcohol based chemical formulation to a substrate layer via an atomizer.

FIG. 3C illustrates the application of a water, or alcohol, based chemical formulation to a substrate layer 12 via an atomizer, 320, and then drying the treated substrate for subsequent use.

The application of the inventive solution to the paper product may be applied during the "wet end" process which involves a slurry of fibers, fillers, and other additives and is most likely the most critical process area for successful production of the high quality and consistent end product.

The biodegradation-modifying water or alcohol based chemical formulation may be added to inks (which may be soy based) used for printing on packages. Alternatively, the water or alcohol based chemical formulation may be incorporated on off-set printing processes.

Still further, the water or alcohol based chemical formulation or the undissolved components thereof may be added to the pulp material used to manufacture the substrate material or the litho sheet stock.

Still another application would be to incorporate a formula made in accordance with the invention into environmentally friendly inks and/or coatings, for applying directly to paper stock during normal operation of an off-set printing press.

A number of compounds are known to inhibit the process of biological methanogenesis. The mechanism of inhibition by many of these compounds is the enabling of other microorganisms to out-compete the methane producers, directing the carbon toward $CO_2$ instead of $CH_4$.

A significant aspect of Applicants' invention is incorporating the inhibitors of methanogenesis into the paperboard glue (rather than into the pulp or spraying them onto the paperboard sheets).

Another significant aspect of Applicants' invention is the inhibition of methanogenesis without generating toxic and malodorous gases (e.g., hydrogen sulfide).

In accordance with one embodiment of the invention, the generation of methane gas is inhibited and the build-up of $H_2S$ is concurrently prevented by combining two different mechanisms:

(a) The acidity of the paper products is controlled (i.e., paper products are manufactured with lower pH (e.g., 4.5 to 6) than is usual, consistent with paper quality. A lower pH (meaning high acidity) may adversely affect paper quality over time. However, a low pH inhibits methanogenesis. In those applications where the usage of the paper product is such that it will have a short life time, a lower pH may be selected without reservation. In other cases a balance may be selected between paper quality and biodegradability; and (b) specific compounds are added which inhibit the production of methane, with the condition that sulfates added would be in the form of ferrous sulfate (or sulfate bonded with another divalent cation) since the divalent metal cations would act to prevent the build-up of $H_2S$.

In addition to the various chemical compounds discussed above, additional chemical compounds and/or solutions which tend to inhibit methanogenesis and which may be applied to paper products (in the glue or to the paper) to enhance degradability include:

A—Bromoethane sulfonate (BES)—inhibits methanogenesis in microcosms; works as a specific inhibitor of one of the key enzymes for methanogenic microorganisms;

B—Lumazine—name for 2,4-dihydroxypteridine; considered a specific inhibitor of methanogenesis;

C—4-(Methylamino)benzoic acid—and analogs like 4-(ethylamino) benzoic acid and 4-(isopropylamino) benzoic acid;

D—Nitroethanol, and the chemically similar Nitropropanol;

E—Plant extracts, including
  i—extracts of root or stalk of yucca plant *Yucca schidigera*, yucca extracts already have a number of established uses, including in some beverages, i.e., apparently no known hazard;
  ii—extracts from leaves of Eastern poplar *Populus deltoides*;
  iii—extracts of flower buds of cloves, *Syzygium aromaticum*;
  iv—extract of garlic bulb, *Allium sativum*
  v—essential oil of sage, *Salvia officinalis*.

As noted above, if it would not compromise the quality of the paper, the pH of the solution may be adjusted to a range between 4.5 and 6, as methanogenesis is inhibited by acidity. Using a paper material manufactured to have a lower pH than is usual, consistent with paper quality, and treating or combining (mixing or impregnating) the paper material with an inhibitory solution of sulfate and containing divalent metal cations. The sulfate ions will inhibit methanogenesis, while the divalent metal cations would combine with any $H_2S$ formed and convert it to insoluble sulfides. Other compounds inhibitory to methanogenesis could be added, such as, for example, ferric pyrophosphate. As already noted, contemplated for use in practicing the invention are compounds concerning which the use of divalent metal cations bonded to sulfate or to other compounds is specified to prevent $H_2S$ build-up or to cause the hydrogen sulfide to precipitate.

The use of nitrates, which are very good inhibitors of methanogenesis, may be considered. However their use may be questionable because they render cellulosic materials highly combustible. However where that is not a concern, these may be used.

What is claimed is:

1. A chemical mixture for controlling the emission of biogases generated by biodegradable matter subject to undergoing anaerobic decomposition includes chemicals for inhibiting the production of methane gas and for, concurrently, inhibiting the production of hydrogen sulfide gas, wherein the chemical mixture includes: (a) at least one of a source of ferric ions and a source of sulfate ions for inhibiting the generation of methane gas; and (b) a source of metal divalent cations for inhibiting the production of hydrogen sulfide gas.

2. A chemical mixture for controlling the emission of biogases generated by biodegradable matter subject to undergoing anaerobic decomposition includes chemicals for inhibiting the production of methane gas and for, concurrently, inhibiting the production of hydrogen sulfide gas, as wherein the chemical mixture is formed from a selection including at least one of the following compounds:
  (a) ferric ammonium citrate for inhibiting methanogenesis;
  (b) ferrous sulfate for inhibiting methanogenesis and the build-up of hydrogen sulfide;
  (c) magnesium sulfate for inhibiting methanogenesis;
  (d) copper sulfate for inhibiting methanogenesis and the build-up of hydrogen sulfide;
  (e) manganese gluconate for preventing the build-up of hydrogen sulfide; and
  (f) zinc gluconate for preventing the build-up of hydrogen sulfide.

3. A chemical mixture as claimed in claim 2 wherein the chemical mixture includes at least one compound selected from the group identified in (a) through (c) for inhibiting methanogenesis; and one compound selected from the group identified in (d) through (f) for inhibiting the build up of hydrogen sulfide.

4. A chemical mixture as claimed in claim 2 wherein the chemical mixture includes the combination of at least three of the compounds selected from the group (a) through (f).

5. A chemical mixture as claimed in claim 2 wherein the mixture includes the following compounds:
  (i) ferric ammonium citrate;
  (ii) ferrous sulfate;
  (iii) copper sulfate;
  (iv) manganese gluconate; and
  (v) zinc gluconate.

6. A chemical mixture as claimed in claim 2 wherein the mixture includes the following compounds;
  (i) ferric ammonium citrate;
  (ii) magnesium sulfate;
  (iii) copper sulfate;
  (iv) manganese gluconate; and
  (v) zinc gluconate.

7. A chemical mixture as claimed in claim 1, wherein the biodegradable matter is a paper product and wherein the mixture is applied to the paper product.

8. A chemical mixture as claimed in claim 1 wherein a liquid is added to the chemical mixture to produce a solution, and wherein the biodegradable matter is a paper product which is treated by one of the following:
  a—application of the solution to the paper product during the manufacture of the paper product;
  b—immersion of the paper product into the solution; and
  c—spraying of the solution onto the paper product.

9. A chemical mixture as claimed in claim 1 wherein a liquid is added to the chemical mixture to produce a solution, and wherein the biodegradable matter is a paper product and wherein the solution is applied to the paper using a biodegradable adhesive.

10. A chemical mixture as claimed in claim 1 wherein the mixture includes chemicals for inhibiting the production of methane gas and for decreasing the rate at which biogases are being emitted.

11. The chemical mixture as claimed in claim 2 wherein the mixture includes at least one of the following compounds for inhibiting methanogenesis:
   (a) Bromoethane sulfonate (BES);
   (b) Lumazine;
   (c) 4-(Methylamino)benzoic acid;
   (d) Nitroethanol, (e) Nitropropanol; and
   (f) Plant extracts.

12. A method for controlling the emission of biogases generated by biodegradable matter undergoing anaerobic decomposition comprising the step of applying to the biodegradable matter a chemical mixture comprising chemicals for inhibiting the production of methane gas and hydrogen sulfide gas, wherein the biodegradable matter is a paper product and wherein the method includes the step of applying the chemical mixture to the paper product using a biodegradable adhesive.

13. A method for controlling the emission of biogases generated by biodegradable matter undergoing anaerobic decomposition comprising the step of applying to the biodegradable matter a chemical mixture comprising chemicals for inhibiting the production of methane gas and hydrogen sulfide gas wherein the step of applying a chemical mixture includes the step of adding a liquid to the chemical mixture to form a solution, which solution includes at least one of the following compounds: (a) a source of ferric ions; (b) a source of sulfate ions; and (c) a source of metal divalent cations.

14. A method as claimed in claim 12 wherein the step of applying a chemical mixture includes the step of including at least one of the following compounds into the mixture:
   (a) ferric ammonium citrate;
   (b) ferrous sulfate;
   (c) magnesium sulfate;
   (d) copper sulfate;
   (e) manganese gluconate;
   (f) zinc gluconate;
   (g) Bromoethane sulfonate (BES);
   (h) Lumazine;
   (i) 4-(Methylamino)benzoic acid;
   (j) Nitroethanol, (k) Nitropropanol; and
   (l) Plant extracts.

15. A method as claimed in claim 12 wherein the biodegradable material is located in any site suitable for the decomposition of the biodegradable material.

16. A method for controlling the biogases emitted by a paper product subject to undergoing anaerobic decomposition comprising the steps of:
   treating the paper product with a chemical mixture including one or more of the following compounds:
   (a) ferric ammonium citrate for inhibiting methanogenesis;
   (b) ferrous sulfate for inhibiting methanogenesis and the build-up of hydrogen sulfide;
   (c) magnesium sulfate for inhibiting methanogenesis;
   (d) copper sulfate for inhibiting methanogenesis and the build-up of hydrogen sulfide;
   (e) manganese gluconate for preventing the build-up of hydrogen sulfide; and
   (f) zinc gluconate for preventing the build-up of hydrogen sulfide;
   (g) Bromoethane sulfonate (BES) for inhibiting methanogenesis;
   (h) Lumazine for inhibiting methanogenesis;
   (i) 4-(Methylamino)benzoic acid for inhibiting methanogenesis; (j) Nitroethanol, for inhibiting methanogenesis;
   (k) Nitropropanol for inhibiting methanogenesis; and
   (l) Plant extracts for inhibiting methanogenesis.

17. A method as claimed in claim 16 wherein the step of treating the paper product includes the step of adding a liquid to the chemical mixture for forming an aqueous solution and one of the following steps:
   (a) immersing the paper product into the aqueous solution;
   (b) spraying the aqueous solution onto the paper product; and
   (c) applying the solution the paper product using a biodegradable adhesive.

18. A method as claimed in claim 16 wherein the paper product is manufactured to have a pH in the range of 4.5 to 6.5.

\* \* \* \* \*